April 16, 1968 D. H. MOONEY, JR 3,378,840
TRANSMITTER SYSTEM FOR APERTURE ADDED RADARS
Filed Aug. 26, 1965 2 Sheets-Sheet 1

David H. Mooney Jr.
INVENTOR.

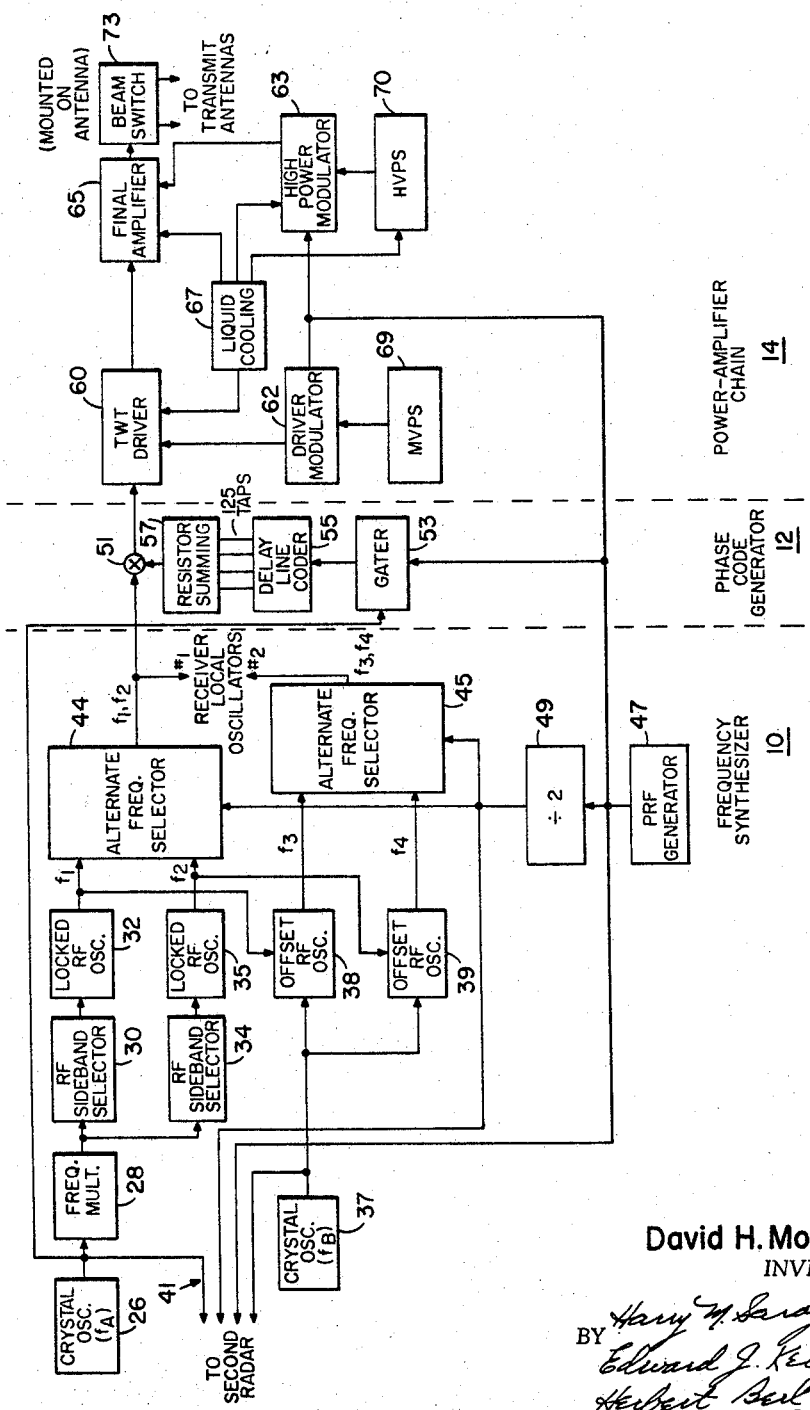

United States Patent Office 3,378,840
Patented Apr. 16, 1968

3,378,840
TRANSMITTER SYSTEM FOR APERTURE ADDED RADARS
David H. Mooney, Jr., Severna Park, Md., assignor, by mesne assignments, to the United States of America as represented by the Secretary of the Army
Filed Aug. 26, 1966, Ser. No. 576,503
10 Claims. (Cl. 343—14)

ABSTRACT OF THE DISCLOSURE

A transmitter system which will transmit alternate pulses of radio frequency energy at two different frequencies. A pair of frequency generators are utilized in conjunction with frequency selectors, multipliers, and offset oscillators to produce separate and distinct radio frequency levels for rapid, alternate transmission. A pulse generator controls the period of alternation between transmission of frequencies.

---

Figure 1:
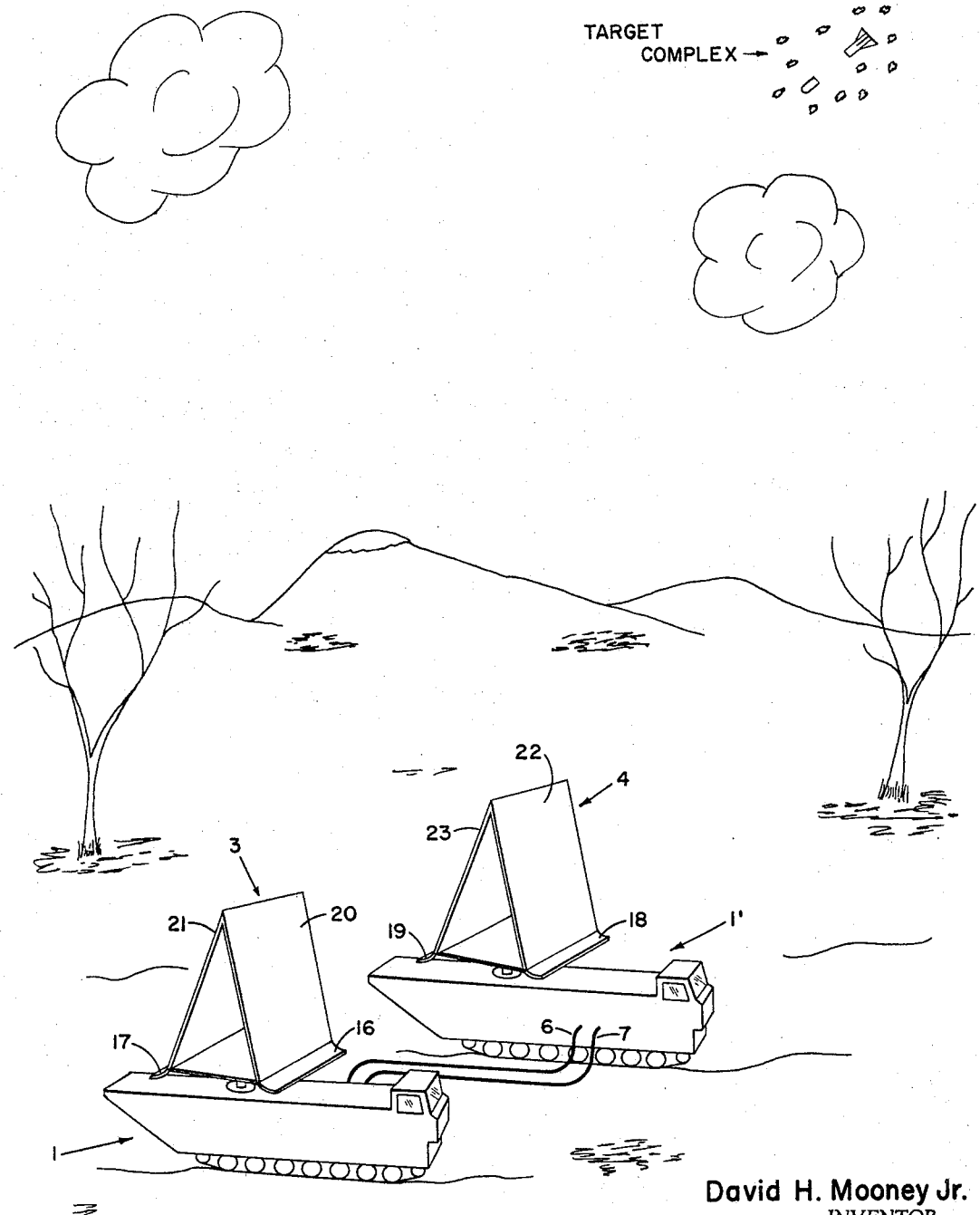

This invention is related to a transmitter unit of a search radar system. Specifically, the invention is related to a transmitter which will transmit alternate pulses of two different radar units at two different transmit frequencies per unit.

Aperture adding is a technique disclosed by P. H. Pincoffs in his patent issued on December 15, 1964, having Patent Number 3,161,870. This technique requires that the data from two or more radars be combined in each radar and processed thereby. Each of the radars will radiate at a different frequency, but each has receivers to receive all of the frequencies. This technique gives an improved range performance for a given transmitter power. However, this technique also presents added problems and complexities to the transmitter of the radar units. This is further complicated by the requirement of each radar unit that it transmit at two different frequencies to provide frequency hopping. The transmitters of the radar units must be synchronized with respect to timing and frequency. A further requirement is that suitable coding of the transmitted frequency be provided so that Doppler processing may be carried out by the processor.

It is, therefore, an object of the invention to provide a suitable transmitter for use in an aperture adding radar system.

A further object of the present invention is to provide a transmitter which will transmit alternate pulses of two different frequencies.

A still further object of this invention is the provision of a transmitter in an aperture adding system which will transmit alternate pulses of each radar of the system at two different transmit frequencies.

The invention further resides in and is characterized by various novel features of construction, combination, and arrangements of parts which are pointed out with particularity in the claims annexed to and forming a part of this specification. Complete understanding of the invention and an introduction to other objects and features not specifically mentioned will be apparent to those skilled in the art to which it pertains when reference is made to the following detailed description of a specific embodiment thereof and read in conjunction with the appended drawing. The drawing, which forms a part of the specification, presents the same reference characters to represent corresponding and like parts throughout the drawing, and wherein:

FIGURE 1 is a diagrammatic representation of the overall search radar system in which the present invention is contained, and FIGURE 2 shows a block diagram illustrating a preferred form of the invention.

The overall search radar complex is shown in FIGURE 1. The primary function of the search radar complex is the initial detection of an approaching target complex (consisting of the warhead and the accompanying fragments, plus any decoys). The system normally consists of two identical search radar vehicles 1 and 1', having their antennas 3 and 4 mounted for rotation. The vehicles are located several hundred feet apart and are interconnected by low frequency cables 6 and 7. These radar vehicles act as a team under normal circumstances, however, when desired or necessary, a single vehicle can perform all the search functions with reduced range performance. This arrangement provides the highly desirable feature of slow death.

The transmitter for each vehicle is a coherent master-oscillator power amplifier type, incorporating a phase-coded pulse compression transmission. Also, pulse-to-pulse frequency hopping is provided by the transmitter. The pulse repetition frequency is kept low enough so that true range is obtained directly, and the pulse width is sufficiently great so that Doppler can be obtained from a single pulse return. Referring to FIGURE 2, it can be seen that the transmitter consists of a frequency synthesizer 10, phase code generator 12, and power amplifier chain 14.

The frequency synthesizer 10 generates the stable microwave and I.F. reference signals required for the conventional and the aperture adding functions of the radar unit. The synthesizer provides the means whereby the transmitted frequency may be hopped between two widely separated values, $f_1$ and $f_2$ on alternate pulses. At the same time the synthesizer provides the local oscillators of the receiver with the signals to alternately receive on these frequencies, and on the frequencies ($f_3$ and $f_4$) of the other radar unit.

The phase code generator 12 operates at I.F. and serves to suitably code the transmitter output so that both range and Doppler information can be simultaneously extracted from the target. The phase code generator output is mixed with the synthesizer $f_1$ and $f_2$ outputs and sent to power amplifier chain 14. The power amplifier chain amplifies the signal, modulates it, and sends it to the transmit antennas of one vehicle where a fan beam will be transmitted having its thin dimension in azimuth.

The transmit antennas are shown in FIGURE 1 as being mounted back-to-back on the vehicles 1 and 1'. Transmitting arrays 16 and 17 are mounted on vehicle 1, and transmitting arrays 18 and 19 are mounted on vehicle 1'. Back-to-back receiver antennas 20–23 are also mounted on the vehicles. The antennas are mechanically scanned in azimuth.

The transmitter of FIGURE 2 consists of a stable crystal oscillator 26 operating at an I.F. frequency $f_A$. The output of oscillator 26 is multiplied by frequency multiplier 28 to R.F. such that a plurality of spectral lines is available in the C-band region. A first adjustable frequency selector 30 will filter out an appropriate component and a R.F. oscillator 32 is phase-locked to it to give the frequency $f_1$. A second frequency selector 34 and oscillator 35 are set to a different multiple sideband of $f_A$ so as to generate $f_2$.

A second crystal oscillator 37 operating at $f_B$ is used as an offset for $f_1$ and $f_2$ so that $f_3$ and $f_4$ can be generated. Separate phase locked oscillators 38 and 39 generate $f_3$ and $f_4$ from their inputs of $f_1$ and $f_B$ for offset oscillator 38 and $f_2$ and $f_B$ for offset oscilllator 39. In this fashion all four frequencies are locked to two low frequency sources, and all can be changed when desired.

Since only low frequency cables interconnect the two search radar vehicles, the frequency synchronization between them must be at I.F. Since all frequencies needed at the second radar can be generated from $f_A$ and $f_B$, only these frequencies need be transmitted over the wire data link 41. Identical multipliers and locked oscillators, located in the second radar vehicle can reproduce the four R.F. signals required. Therefore, the transmitters of the other vehicles need not have oscillators such as oscillators 26 and 37. In this way all the frequencies transmitted will be locked to oscillators 26 and 37. PRF generator 47 and 1/2 divider 49 outputs are also connected to the other vehicles. However, because of the requirement of slow death, all the vehicles will have all the components, but the corresponding oscillators to 26 and 37 will be set in an off condition, as will the PRF and 1/2 divider.

The pair $f_1$ and $f_2$ and the pair $f_3$ and $f_4$ must be alternately switched once each repetition period of the transmitter. Two alternate frequency selectors 44 and 45 are used to perform this function. Selectors 44 and 45 are controlled by the pulse repetition frequency generator 47 which is connected to their control inputs by way of a 2/1 frequency divider 49. Each of these selectors consists of a hybrid coupler-diode switch which can be switched at an extremely rapid rate by electronic control of the diode. The output of the two selectors are appropriate for use as the local oscillator signals #1 and #2 for the two receivers of the radar vehicle.

The output from selector 44 is further fed to one input of mixer 51 of phase code generator 12. The phase code generator operates at I.F. and serves to suitably code the transmitter so that both range and Doppler information can be simultaneously extracted from the target. The coder is controlled by PRF generator 47 by way of its gater 53. A multi-tapped delay line 55 feeds the other input of mixer 51 by way of resistor summing 57. The multi-tapped delay line is used to generate an I.F. signal which has a total pulse length typically of 450 $\mu$seconds, but with segments of 3.6 $\mu$seconds each. They will have either a 0° or 180° relative phase. The phase reversals are obtained by having either plus or minus polarity taps available from the delay line. These taps are spaced by the 3.6 $\mu$second segment interval. By selecting an appropriate psuedo-random code for the phases, reconstitution of the target signal into a 3.6 $\mu$second pulse will take place in a similar line, in the receiver. The coded I.F. signal is heterodyned with the switch $f_1$ and $f_2$ output of selector 44 in mixer 51 so as to obtain an R.F. phase-coded signal, suitably hopped in frequency, for use as the transmitted signal.

The output of mixer 51 is sent to the power amplifier chain 14. The power amplifier chain is made up of traveling wave tube 60, modulators 62 and 63, final amplifier 65, and liquid cooling means 67. The power amplifier chain is the most straightforward part of the transmitter, but due to its high power, it represents nearly the entire transmitter size, weight, and power consumption. The power supplies 69 and 70 and the modulators 62 and 63 must maintain a peak phase modulation in the order of one degree or less to maintain an R.F. having an instantaneous bandwidth of 3.5 percent centered at 5750 mc. The amplifier will have a peak output power of 64 kw. at a duty cycle of 0.1.

The output of final amplifier 65 is sent to a beam switch 73 which is mounted on the antenna of one of the vehicles. As the antenna (for example, antenna 3 of vehicle 1 of FIGURE 1) is rotated mechanically, beam switch 73 will alternately connect the output of amplifier 65 to the transmitting antennas 16 and 17. Beam switch 73 will change connections every 180° of azimuth. By so doing this allows scanning of 180° of the horizon without the need of oscillating the antenna or of having the scan time be discontinuous. If whole horizon scan is desired, the beam switch can be locked so that it will not switch; therefore only one antenna will transmit and will transmit for the full 360°.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. It will be apparent to those skilled in the art that changes may be made in the form of the apparatus disclosed without departing from the spirit of the invention as set forth in the disclosure, and that in some cases certain features of the invention may sometimes be used to advantage without a corresponding use of other features. It is, therefore, to be understood that within the scope of the appended claims, the invention may be practiced otherwise than as specifically described. Accordingly, it is desired that the scope of the invention be limited only by the appended claims.

I claim:

1. A transmitter system comprising a frequency synthesizer means having first, second, third, and fourth outputs, first and second selector means each having two different inputs connected to two different outputs of the synthesizer means, said selector means each having a control input and an output, a pulse repetition frequency generator means having an output connected to the control input of each of said selector means for periodically applying a control signal to said control input causing said selector output to be alternately connected within the selector to said two different inputs, an antenna means, circuit means connecting the output of said first selector means to said antenna means, first and second local oscillator means, and circuit means respectively connecting the outputs of said first and second selector means to said first and second local oscillator means.

2. A transmitter system as set forth in claim 1 wherein said outputs are radar pulse outputs, and said circuit means contains a pulse coding means.

3. A transmitter system as set forth in claim 2, wherein said circuit means further contains a modulated amplifier means connected between said pulse coding means and said antenna means.

4. A transmitter system as set forth in claim 1, wherein said frequency synthesizer means comprises first and second frequency generating means, third frequency selector means having inputs connected to an output of said first frequency generating means, said third selector means having outputs which are the first and second outputs of said frequency synthesizer means, first offset means having inputs connected to an output of said second frequency generating means and said first output of the synthesizer means, whereby said first offset means will have an output which is the third output of said frequency synthesizer means, and second offset means having inputs connected to the output of said second frequency generating means and said second output of the synthesizer means, whereby said second offset means will have an output which is the fourth output of said frequency synthesizer means.

5. A transmitter system as set forth in claim 4, further comprising a frequency multiplier means connected between said first frequency generating means and said third frequency selector means.

6. A frequency synthesizer system having first and second frequency generating means, a first synthesizer connected to said first frequency generating means, said synthesizer comprising a frequency selector means having inputs connected to an output of said first frequency generating means, said frequency selector means having first and second outputs of a first and a second frequency value respectively, first offset means having inputs connected to an output of said second frequency generating means and said first output of said frequency selector means, whereby said first offset means will have an output of a third frequency value, and second offset means having inputs connected to the output of said second frequency generating means and said second output of said frequency selector means, whereby said second offset means will have an output of a fourth frequency value.

7. A frequency synthesizer system as set forth in claim 6, further comprising a frequency multiplier means connected between said first frequency generating means and said frequency selector means.

8. A frequency synthesizer system as set forth in claim 7, wherein said selector means comprises two series combinations of a sideband selector and a phase locked oscillator.

9. A frequency synthesizer system as set forth in claim 8, wherein said first and second frequency generating means are at IF frequency values and said first through fourth frequency values are at RF frequency values.

10. A frequency synthesizer system as set forth in claim 9, further comprising at least one other synthesizer having connections to the outputs of said first and second frequency generating means in the same manner as said first synthesizer.

References Cited
UNITED STATES PATENTS

| | | | |
|---|---|---|---|
| 2,895,128 | 7/1959 | Bryden | 343—203 |
| 3,020,399 | 2/1962 | Hollis. | |
| 3,114,106 | 12/1963 | McManus | 325—56 |
| 3,178,712 | 4/1965 | Fitzgerald et al. | 343—102 X |
| 3,226,644 | 12/1965 | Goode et al. | 325—56 |
| 3,300,780 | 1/1967 | Mason | 343—12 |

RODNEY D. BENNETT, *Primary Examiner.*

J. P. MORRIS, *Assistant Examiner.*